United States Patent [19]

Conroy

[11] 3,754,781

[45] Aug. 28, 1973

[54] THERMPOLASTIC PIPE COUPLING
[75] Inventor: Kevin Conroy, Acton, Ontario, Canada
[73] Assignee: Esso Research and Engineering Company, Linden, N.J.
[22] Filed: Sept. 13, 1971
[21] Appl. No.: 179,686

[52] U.S. Cl............... 285/322, 285/334.4, 285/343, 285/382
[51] Int. Cl............................................. F16l 21/06
[58] Field of Search................... 285/322, 343, 382, 285/382.2, 343, 243, 256, 334.4, 382, 40, 374

[56] References Cited
UNITED STATES PATENTS
3,668,612 6/1972 Nepovin.............................. 285/322
2,246,557 6/1941 Walters............................ 285/322 X
3,425,719 2/1969 Burton.............................. 285/382.2

Primary Examiner—Jordan Franklin
Assistant Examiner—Wayne L. Shedd
Attorney—Leon Chasan, Harold N. Wells et al.

[57] ABSTRACT

A coupling for use in joining lengths of plastic pipe comprising a cylindrical body having a socket to receive and securely grip the end of a piece of pipe. The body is engaged by a locknut having a tapered portion which forces a threaded collet on the body against the pipe to secure it.

2 Claims, 2 Drawing Figures

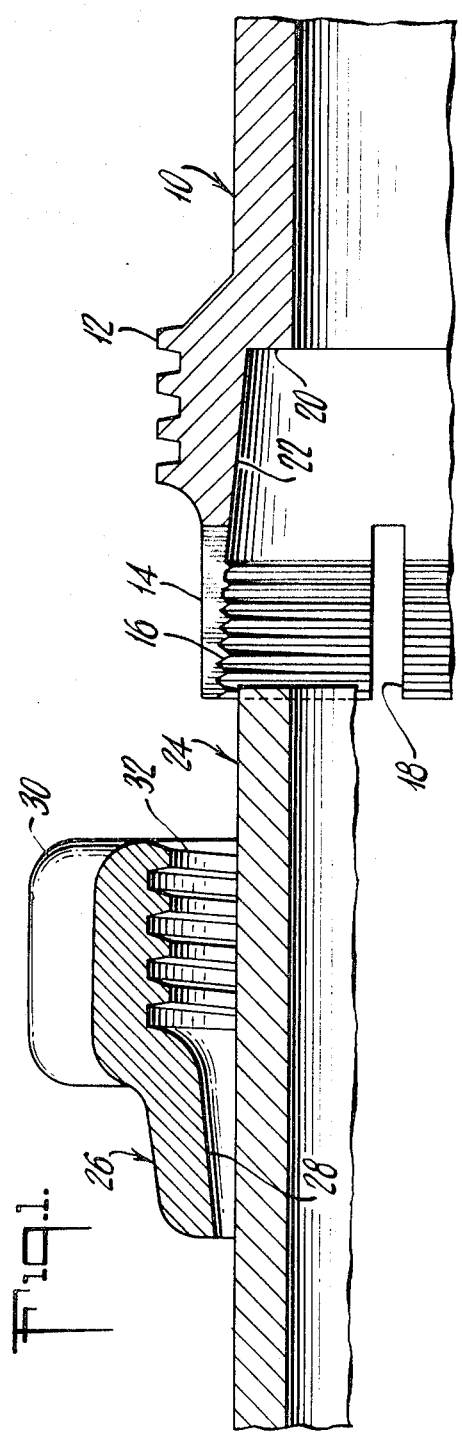
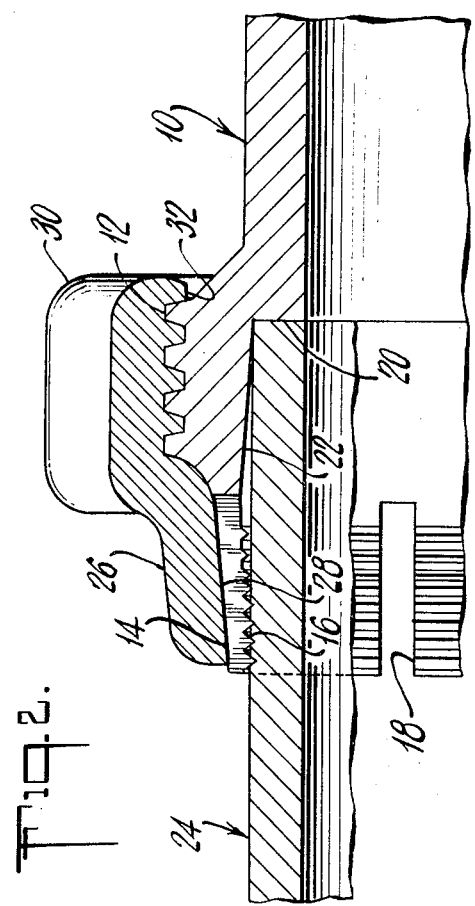

THERMOPLASTIC PIPE COUPLING

BACKGROUND OF THE INVENTION

The invention disclosed herein relates to a novel and improved coupling for pipe and more particularly to a coupling for substantially rigid plastic pipes made of materials such as vulcathene, polyethylene, or other suitable materials.

The joining of plastic pipe presents a variety of difficult problems. Plastic pipes are essentially rigid but retain a degree of flexibility, making it difficult for the coupling to grip the pipe properly. If the pipe is not securely held within the coupling, a leak is likely and complete failure of the joint is possible. Since the pipe surface can be distorted by the action of the coupling, it is generally difficult to make and remake a joint without removing a damaged portion of the pipe to expose new surfaces. Thus, disassembly of a joint is to be avoided wherever possible, particularly in domestic use where a joint is not accessible after being installed.

The coupling of the present invention provides a means for joining lengths of plastic pipe whereby a tight seal is achieved and obviating the need for remaking a joint once it has been assembled.

SUMMARY OF THE INVENTION

In the coupling of the present invention a positive gripping action is always obtained. The coupling consists of two portions--a cylindrical body containing a socket to receive the end of the pipe to be coupled and a split collet with internal threads of varying depth to grip the pipe. The second member is a locknut having a tapered portion which forces the threaded collet into locking engagement with the plastic pipe, securing it within the socket, thereby providing a leakproof seal.

BRIEF DESCRIPTION OF THE DRAWINGS

FIG. 1 shows a disassembled view of a coupling according to the present invention and a piece of plastic pipe adapted to be joined to the coupling.

FIG. 2 shows the coupling of FIG. 1 assembled wherein the plastic pipe has been inserted into a socket and secured by engaging the threaded collet.

DESCRIPTION OF THE PREFERRED EMBODIMENT

The pipe coupling as disclosed in the drawings consists essentially of two parts generally designated as 10 and 26. The first part comprises cylindrical body 10 which is attached to another length of pipe (not shown) by conventional means such as solvent welding, thermal fusion, threaded connection or other acceptable means. A threaded portion 12 is located on the exterior of cylindrical body 10 positioned so to engage the mating thread on the locking nut 26. Outwardly from the threaded portion 12 is the collet area 14 which has internal threads 16 which taper and provide a variable threading depth in order to assist the engagement of the threads with the mating plastic pipe. In order to provide needed flexibility and to prevent buckling axial or longitudinal extending slots 18 are provided on the periphery of the tapered collet area 14. The socket area 22 of body 10 is tapered internally in order to force the pipe 24 which enters that area to seal more effectively against the walls of the socket area 22. It will be seen that when plastic pipe 24 is moved into the tapered socket 22 it will be compressed until it reaches the shoulder stop 20.

The second part of the coupling is locking nut 26. It is slipped over the end of plastic pipe 24 prior to assembly of the coupling. The locking nut 26 has an interior threaded portion 32 which engages operatively with the threads 12 on body 10. Lugs 30 are provided on the exterior of the locking nut 26 in order to assist in applying sufficient pressure to secure the plastic pipe in place within the coupling. A tapered area 28 is provided adjacent to the threaded area in order to engage the collet 14 on the body 10. It can be seen that once plastic pipe 24 has been inserted into body 10 until it reaches the shoulder stop 20 and the locking nut 26 is moved into operable engagement with the threads 12 that the tapered area 28 on the locking nut 26 will begin to force the collect area 14 inward until the threads 16 grip plastic pipe 24. The threads 16 will normally penetrate the surface of pipe 24 (see FIG. 2) and resist "pull out" of the pipe from the socket portion 22. The tapered threads 16 on the body 10 have the greatest depth at the outer end so that they engage the plastic pipe 24 first at the outer end and then, as further pressure is applied, the inner threads of lesser depth engage the pipe. Thus, the largest penetration of the threads is at the outer portion or extremity of the joint.

In FIG. 2 can be seen the coupling and pipe joint fully assembled wherein the features of the invention are clearly illustrated. The locking nut 26 has been fully engaged with the cylindrical body 10. The tapered area 28 has forced the collet area 14 inwardly and the threads 16 have penetrated the outer wall of the plastic pipe 24 in order to secure it in position. The action of the tapered area 28 on the locking nut also has the effect of forcing the pipe 24 toward the shoulder stop 20, thereby compressing the end of the pipe against the stop 20 and the sides of the pipe against tapered area 22. Thus, tightening the locking nut 26 not only secures the pipe, but assists in making a positive seal.

The invention is not limited to the preferred embodiment which is illustrated and described above. Modifications could be made to the coupling without departing from the essential spirit of the invention. Having described a preferred embodiment of the invention, its scope is determined by the claims which follow.

What is claimed is:

1. A coupling for joining lengths of plastic pipe comprising in combination:
  a. a hollow cylindrical member adapted at one end for fixed attachment to a first length of pipe and having:
     1. an externally threaded portion,
     2. a tapered internal socket located at the end oposite the end for fixed attachment to said first length of pipe, said internal socket tapering axially inward toward a shoulder stop adapted to abut the end of a second length of plastic pipe inserted inside said socket, an internally threaded collet disposed outwardly of said socket having a continuously varying thread depth tapering axially outward from the outermost extremity of said collet toward said socket and longitudinal slots extending inwardly from the outermost extremity of said threaded collet thereby permitting movement of said collet radially inward and axially toward said shoulder stop to engage the second length of plastic pipe with said internal threads and to compress the end of said second pipe against said shoulder stop;

b. a cylindrical locking nut adapted to fit over the end of said second length of plastic pipe, having internal threads at one end for operable engagement with the external threads of said cylindrical member and a tapered inner surface at the other end for urging said threaded collet of the cylindrical member radially inward and axially toward said shoulder stop into locking engagement with the end of said second length of plastic pipe when said second length of pipe is abutting said internal shoulder stop of the cylindrical member.

2. The coupling of claim 1 wherein said locking nut has external lugs to assist in the assembly of said coupling.

* * * * *